United States Patent [19]

Gage

[11] Patent Number: 4,745,699
[45] Date of Patent: May 24, 1988

[54] FISHING LURE

[76] Inventor: Steven M. Gage, 26450 Crocker, No. 719, Mount Clemens, Mich. 48043

[21] Appl. No.: 25,004

[22] Filed: Mar. 12, 1987

[51] Int. Cl.$^4$ ............................................. A01K 85/00
[52] U.S. Cl. ................................... 43/42.09; 43/42.36
[58] Field of Search ............... 43/42.09, 42.08, 42.36, 43/42.44

[56] References Cited

U.S. PATENT DOCUMENTS

| | | | |
|---|---|---|---|
| 1,955,408 | 4/1934 | Chapleau | 43/42.36 |
| 2,127,639 | 8/1938 | Breuer | 43/42.09 |
| 2,164,415 | 7/1939 | Mallett | 43/42 |
| 2,313,572 | 3/1943 | Nungesser | 43/45 |
| 2,570,100 | 10/1951 | Collins | 43/42.09 |
| 2,573,399 | 10/1951 | Cannon | 43/42.09 |
| 2,750,701 | 6/1956 | Beames | 43/42.09 |
| 3,122,852 | 3/1964 | Bocchino | 43/42.08 |
| 4,329,804 | 5/1982 | Brown | 43/42.09 |
| 4,402,155 | 9/1983 | Mumma | 43/42.09 |
| 4,573,283 | 3/1986 | Pippert | 43/42.09 |

FOREIGN PATENT DOCUMENTS 1509103  12/1967  France ............................. 43/42.08

Primary Examiner—Gene P. Crosby
Attorney, Agent, or Firm—Brooks & Kushman

[57] ABSTRACT

A fishing lure having interchangeable bodies which can be removably attached to a hook carrier assembly. The body is provided with a ventral slot extending axially the length thereof and the hook carrier is provided with a line attachment and has one or more hooks attached thereto and resiliently fastens to a body and fits within the ventral slot.

13 Claims, 2 Drawing Sheets

U.S. Patent   May 24, 1988   Sheet 1 of 2   4,745,699
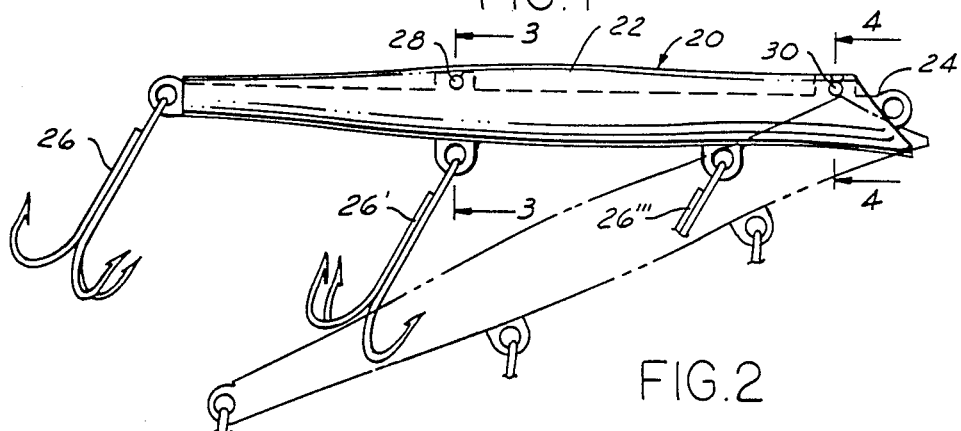
FIG. 1
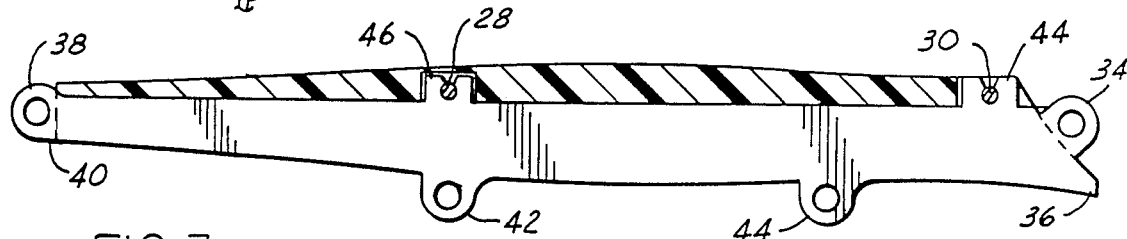
FIG. 2
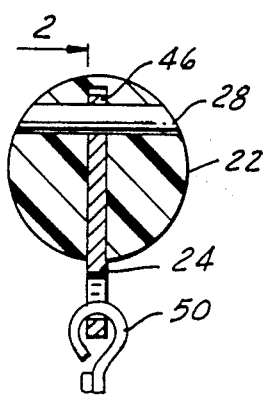
FIG. 3
FIG. 4
FIG. 5
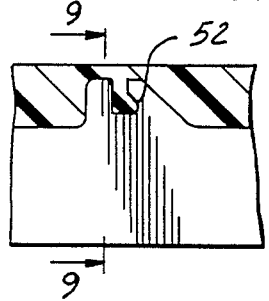
FIG. 7
FIG. 6
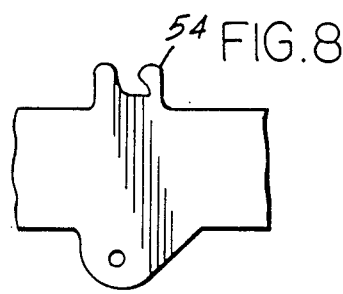
FIG. 8
FIG. 9

FISHING LURE

FIELD OF INVENTION

This invention relates to fishing lures and more particularly to fishing lures having interchangeable body members.

BACKGROUND OF INVENTION

When fishing using artificial lures, it is quite common to try numerous different color lures in order to determine which color performs the best on a given day. It is difficult to explain, but for some reason some fish species, particularly walleye and salmon are very color sensitive and colors that may have worked remarkably well a week or even a day earlier may stimulate very little interest while a previously ineffective color may suddenly begin to catch fish. When trolling for example all other conditions are comparable, lure colors can cause a particular lure to have as many as three or four times as many strikes as a lure of an unpopular color. There are many who speculate that color preference is caused by such factors as sun light, water clarity, temperatures, barometer, time of day, etc., however, a great many fisherman use the trial and error technique to determine the most effective color for a particular fishing situation. When a hot color is found, it is not infrequent for that particular color lure to be installed on all of the rods on a boat until the fish stop biting, then the trial and error color selection procedure may once again resume. All of this lure color changing necessitates the frequent changing of lures and inventory of a great number of different color lures. It is not an unusual sight to see boats equipped with ten or twenty lures of a particular type differing only in color. The storage of fishing lures, therefore, becomes a problem since they invariably tangle together. Frequent changing also requires the line to be frequently attached and detached to the various lures. To facilitate frequent attachment and detachment, many fishermen, however, prefer to tie a knot believing that the snap swivel detracts from the lure's aesthetic appearance as well as performance in the water.

In order to simplify lure changing there has been various attempts to develop a workable fishing lure having a detachable body enabling bodies of various colors to be removably attached to a hook carrier assembly. Examples of plug-type lures having removable bodies as shown in U.S. Pats. Nos. 2,750,701, Beames, and 4,402,155, Mumma. There has also been several attempts to develop interchangeable bodies for spoon-type lures as shown in U.S. Pats. Nos. 2,164,415, Mallet, 2,313,572, Nungesser and 4,573,283, Pippert. In addition to plugs and spoons, a great number of lures of various types, plugs, spoons, jigs, and spinner baits have been used having removable skirts such as that shown in U.S. Pat. No. 4,329,804, Brown.

OBJECTS, FEATURES AND ADVANTAGES OF THE INVENTION

An object of the present invention is to provide a fishing lure having easily interchangeable bodies which are detachable from the hook carrier assembly.

Another object of the invention was to allow for body removal and replacement without necessitating the detachment of the fishing line from the lure. Another object of the invention was to develop a simple, easy-to-manufacture, inexpensive fishing lure.

A feature of the present invention is that bodies of varying shapes and colors may be attached to a single hook carrier assembly.

Another feature of the invention is that hooks can be easily removed and replaced on the hook carrier assembly when the body is detached. Another feature of the invention is that bodies may be formed of different identity materials enabling the lure's buoyancy characteristic to be varied.

Another advantage of the invention is that the hook carrier and body can be readily injected-molded out of plastic and assembled with minimal labor costs. Another advantage of the invention is that a large number of lure colors, shapes and buoyancies may now be obtained without the necessary expense associated with purchasing a large number of hooks and associated hardware. Another advantage of the invention is that the unused bodies can be sotred in a relatively compact space without fear of tangling.

These and other features and advantages of the invention will be apparent upon further review of the description of the preferred embodiment.

SUMMARY OF INVENTION

Accordingly, a fishing lure of the present invention includes one or more detachable elongated bodies which can be formed of a variety of sizes, densities, and colors. Elongated bodies are provided with an axially extending ventral slot formed therein. The body can be removably attached to an elongated hook carrier having a planar member sized for insertion within the body's ventral slot. The hook carrier is provided with means for attaching the lines and means for attaching at least one hook. The body and carrier are provided with resilient fastener means enabling the body to be securely installed and conveniently removed from the hook carrier.

BRIEF DESCRIPTION OF THE DRAWINGS

FIG. 1 is a side elevation of the preferred embodiment of the fishing lure showing the hook carrier assembly in phantom outline;

FIG. 2 is an enlarged cross-sectional view of the fishing lure taken along line 2—2 of FIG. 3;

FIG. 3 is a cross-sectional view taken along line 3—3 of FIG. 1;

FIG. 4 is a cross-section view taken along line 4—4 of FIG. 1;

FIG. 5 is an enlarged fragmentary cross-sectional view of the body showing the pin structure;

FIG. 6 is a cross-sectional view of the lure body taken along line 6—6 of FIG. 5;

FIG. 7 is an alternative body design employing a lug rather than a pin;

FIG. 8 is a partial side view of the hook carrier assembly;

FIG. 9 is a cross-section of the alternative body taken along line 9—9 or FIG. 7;

DETAILED DESCRIPTION OF THE PREFERRED EMBODIMENT

Figure 10:
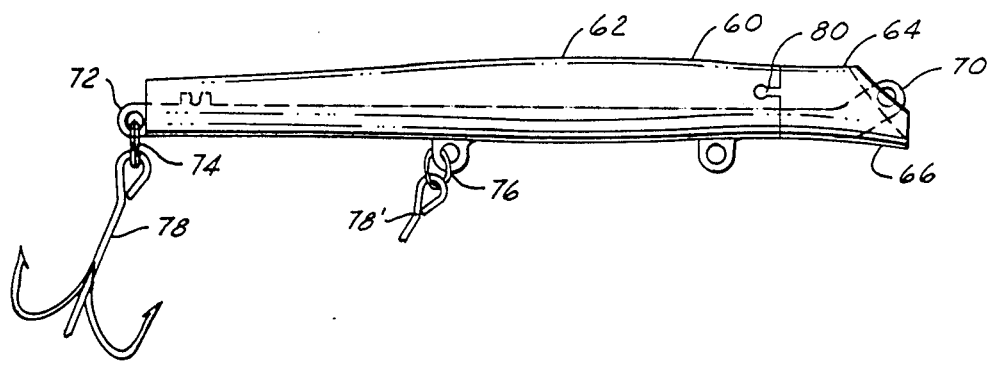
FIG. 10 is the alternative body shown in FIG. 7.

Several preferred embodiments of the invention are illustrated by way of example in FIGS. 1-13. Specific reference to FIGS. 1-5 a first embodiment of the invention is shown. The fishing lure 20 is provided with a body 22, a hook carrier assembly 24, a plurality of hooks 26, 26' and 26". FIGS. 3-4 are cross-sectional views taken along lines 3—3 and 4—4 in FIG. 1 respectively. A pair of pins 28 and 30 are affixed to body 22 and provide a means for attachment of the hook carrier assembly 24 to the body 22. body 22 is provided with a ventral slot 32 which extends axially along the central, lower-most portion of the body and projects generally radially inwardly thereto. The hook carrier assembly 24 is a generally planar member sized to slidingly fit within the ventral slot 32 as shown in FIGS. 1-4. FIG. 6 is a cross-sectional view of the body with the hook carrier assembly removed, but otherwise similar to FIG. 3, more clearly showing ventral slot 32. The ventral slot extends about the pins 28 and 30 as shown in FIGS. 2 and 5 to provide adequate clearance for the fastener means incorporated into the hook carrier which cooperates with the pins.

Hook carrier assembly 24 is best shown in FIGS. 2 with the hooks removed. FIG. 2 is a cross-sectional view taken along line 2—2 in FIG. 3. Hook carrier 24 is a thin, plate-like member sized to fit in ventral slot 32. Hook carrier 24 is provided with an eyelet 4 for line attachment at the first end of the lure 36 and an eyelet 38 for attachment of hook 26 at the second end of the lure 40. The central portion of the hook carrier is provided with two additional eyelets 42 and 44 for the attachment of hook 26' and 26" respectively. The upper edge of the hook carrier is provided with a pair of fastener clips 46 and 48. The fastener clips snap onto pins 28 and 30 respectively to provide resilient fastener means allowing the body to be freely installed and removed from the hook carrier without removing the line attached to the hook carrier. In order to remove the body from the hook carrier, the fisherman simply grasps the hook carrier eyelet 42 and the upper portion of hook 26 with one hand and grasps the lure body 22 with the other hand and simply pulls the two members apart. After clip 46 and pin 28 are initially separated, the fisherman simply rotates the hook carrier assembly 24 to the position shown in a phantom outline in FIG. 1 pivoting the hook carrier above pin 30. Once there is sufficient hook carrier for the fisherman to grasp, hook carrier is pulled free of the body detaching fastener clip 48 from pin 30. This process is reversed for attachment of the lure body 22 to the hook carrier assembly. The hook carrier assembly and body are moved relative to one another during detachment and attachment along an axis parallel to line xx which is generally perpendicular to the elongated lure body and lies generally within the plan of the ventral slot. By causing the attachment axis to be so crimped, an axial load of the lure body relative to the hook carrier caused by a strike by a fish or a snag on an underwater obstruction does not cause the body and hook carrier to become detached.

In the first embodiment of the invention shown in FIGS. 1-6, hooks 26, 26' and 26" are attached directly to eyelets 40, 42 and 44 respectively. As shown in FIG. 3, the hook eyelet 50 is formed of a wire member fed into a substantially closed loop. Prior to installation on the hook carrier, the hook eyelet 50 is slightly open to allow installation on the hook carrier eyelet. After installation, the hook carrier 50 is crimped or mechanically deformed to close the eyelet to prevent removal. This attachment method is relatively strong and simple and the rotation of the hook about its shank axis can be controlled to position the central treble hooks optimally relative to the body.

The lure bodies 22 can be formed of wood, with plastic or metal pins pressed or bonded thereto. Or the body may be alternatively molded out of plastic with the pins insert molded or installed subsequently. The hook carrier can be formed of metal such as a plated steel or aluminum, but ideally the hook carrier can be molded of plastic. There are many high-strength plastics available that are more than strong enough to exceed any load exerted by a fishing line. Forming the hook carrier of plastic further enables the fabrication of a resilient clip for attachment to the pins in the body.

As an alternative to the pin shown in FIGS. 1-6 above, it is possible to form a projection 52 in the body as shown in FIG. 7 which will serve a similar function to the pin described above. Projection 52 and pins 28 and 30 can be generically referred to as lugs which cooperate with a corresponding receptacle or clip formed in the hook carrier. FIG. 8 shows a portion of a said hook carrier and clip 54 specifically designed to cooperate with the projection 52 shown in FIG. 6. As shown in FIGS. 7 and 9, projection 54 is integrally formed into body 22 and can be molded simply using a multipart ventral slot mold insert to eliminate the necessity of insert molding a pin or subsequently installing a pin. bodies molded in such a manner are ready for use right out of the mold after any paint, if desired, is applied to the base color of the plastic selected.

Figure 11:
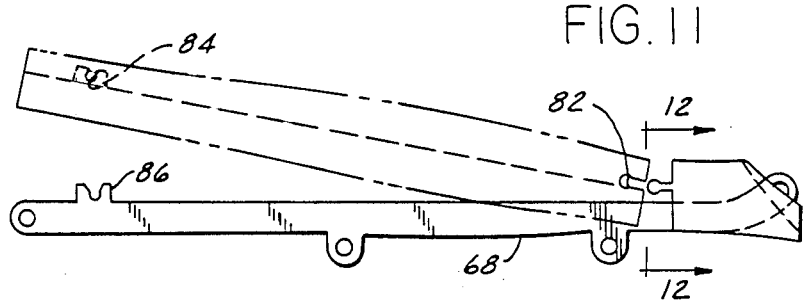
FIG. 11 is a exploded side elevation of the fishing lure of FIG. 9 showing the body partially removed.
Figure 12:
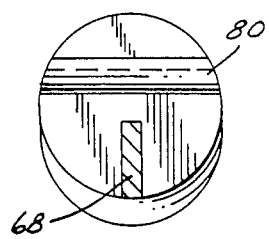
FIG. 12 is a cross-sectional view of the hook carrier assembly taken along line 12—12 in FIG. 11.

FIGS. 10-12 show a second embodiment of the fishing lure 60 having a body 62 and a hook carrier assembly 64. Hook carrier assembly 64 is provided with an enlarged head 66 attached to planar members 68. Hook carrier assembly is provided with an eyelet assembly adjacent to the first end of the lure providing a means for line attachment and then eyelet 72 with the second end of the lure providing means for hook attachment.

Eyelets 74 and 76 are additionally formed as part of the planar member in a central region thereof for attachment of additional hooks. Rather than attaching hooks directly to the hook carrier as known in the first embodiment of the invention split rings 74 and 76 are employed to attach hook 78 and 78'. Whether or not split rings are used is merely a matter of design choice and either emobidment of the invention can be fabricated with or without split rings.

In the second embodiment of the invention which employs hook carrier having a head attachment lug 80 projects rearwardly from the head for insertion into receptacle 82 formed in body 62. In order to connect lug 80 with receptacle 82, the body and hook carrier assembly are moved generally axially relative to one another. Once the body is snapped into place in its forward position, the second end of the body is snapped downward to cause projection 84 in the body to engage fastener clip 86 formed in the planar member. The body 62 like that of the first embodiment is provided with a ventral slot 88 extending axially the length thereof along the lower portion of the body. Planar member 68 is sized to fit within the ventral slot. To detach the body from the carrier, the rearward end of the body adjacent eyelet 72 is grasped and the hook carrier withdrawn partially from the ventral slot detaching clip 86 from corresponding projection 84. With the rearward fastener disconnected, the body can then be shifted axially rearward to cause the body to become completely detached.

Figure 13:
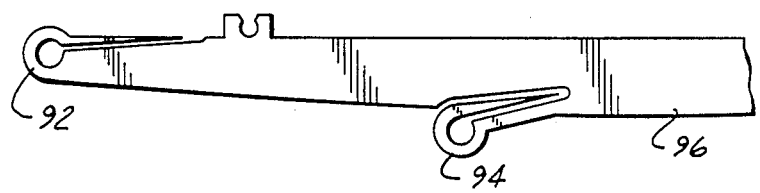
FIG. 13 is an alternative embodiment of the hook carrier planar member employing J-shaped hook attachments.

Alternative embodiment of the carrier shown in FIG. 13 having a split eyelet for hook attachment. This modified hook carrier design can be employed with either of the embodiments of the invention described previously. Rather than having a closed eyelet for hook attachment, the eyelet is rather formed of a generally J-shaped member having one end thereof free to enable the closed hook eyelet to be installed thereon. In order to install the hook, the lower portion of the J-shaped eyelet is grasped and twisted causing the free end to deform out of the plan of the hook carrier. The hook eyelet is then slipped over the free end of the J-shaped eyelet and slid into place. With the hooks installed on the hook carrier and the body in place, the free ends of the J-shaped hook attachment eyelets are protected within the body to securely retain the hooks using commercially available high strength plastics. J-shaped hook mounting eyelets 90 and 92 can be readily integrally molded into the hook carrier 94 and provided more than adequate strength to resist any load typically exerted on the eyelet by the fishing line and fish. Hook attachment eyelets of this J-shaped design can enable a fisherman to replace damaged or broken hooks quickly while fishing without even detaching the lure from the fishing line.

Figure 14:
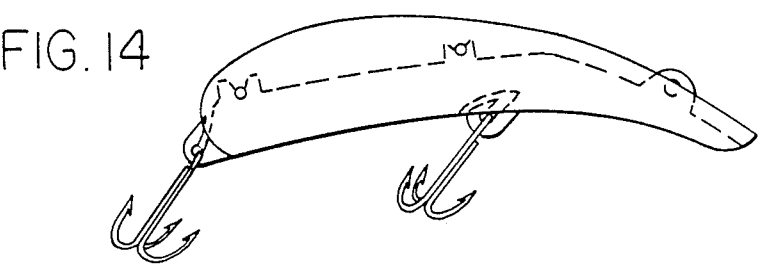
FIG. 14 is an alternative embodiment of the invention employing a different body shape.

Fishing lures fabricated pursuant to the present invention need not be in the form of a pencil plug as shown in the first two embodiments of the invention. FIG. 14 depicts an alternative lure shape for the purposes illustrating that the present invention is flexible enough to be adapted to a wide variety of lure shapes and designs. A lure 100 of FIG. 14 happens to be in the general shape of a Flatfish TM lure which is also frequently used by trollers and comes in a wide variety of colors.

It will be also understood, of course, that while the form of the invention herein shown and described constitutes a preferred embodiment of the invention, it is not intended to illustrate all possible froms thereof. It will also be understood that the words used are words of description rather than limitation and various changes may be made without departing from the spirit and scope of the invention disclosed.

I claim:

1. A fish lure comprising:
    an elongated body having a first and second end and an axially extending ventral slot formed therein;
    an elongated hook carrier having a planar member sized for insertion within the slot in said body and having means for line attachment formed in one end projecting outwardly of the first end of the body and means for attaching at least one hook to a portion of the hook carrier planar member projecting outwardly of the ventral slot;
    at least one hook attached to said hook carrier; and
    wherein said body and hook carrier being further provided with a lug formed in the body and projecting into the ventral slot and a corresponding receptacle formed in the hook carrier planar member, at least one of which being formed of a resilient material to form a secure temporary attachment by shifting the lug into and out of cooperation as a result of relative movement therebetween along a fastener axis which is generally perpendicular to the axis of the body and falling within the plane of the ventral slot, to allow said body to be freely installed upon and removed from said hook carrier without removing the line attached thereto.

2. The invention of claim 1 wherein the hook carrier planar member is formed of a plastic material.

3. The invention of claim 2 wherein the means for line attachment comprises an eyelet formed in the hook carrier planar member.

4. The invention of claim 2 wherein the means for hook attachment comprises an eyelet integrally formed in the hook carrier planar member.

5. The invention of claim 2 where a hook is attached to the hook carrier planar member adjacent the second end of the body.

6. The invention of claim 5 further provided with at least one hook attached to the hook carrier planar member in a central region of the body.

7. The invention of claim 1 wherein the means for hook attachment further comprises a J-shaped projection formed in the hook carrier planar member having a free end for installation of a hook when the hook carrier is removed from the body, said free end aligned within the ventral slot when the hook carrier is attached to the body thereby securely retaining the hook in place.

8. The invention of claim 1 wherein the hook carrier comprises an enlarged head attached to the end of the hook carrier planar member provided with means for line attachment, said head being generally aligned with the elongated body adjacent to the first end of the elongated body when the hook carrier and body are attached together.

9. A fishing lure comprising:
    an elongated body having a first and second end, and an axially extending ventral slot formed therein;
    an elongated hook carrier comprised of an elongated planar member having an enlarged heat attached to one end thereof forming an outline of the lure said planar member sized for insertion within the slot in the body and provided with means for attaching at least one hook thereto, said enlarged head being generally aligned with the elongated body adjacent the first end thereof when the hook carrier and body are attached together, and provided with a means for line attachment;
    at least one hook attached to said hook carrier; and
    wherein said body and hook carrier head being further provided with first resilient fastener means to allow said body to be freely installed upon and removed from said hook carrier without removing the line attached thereto.

10. The invention of claim 9 wherein said hook carrier head is further provided with a male fastener receptacle and said body first end provided with a corresponding female fastener projection cooperating therewith enabling the body and hook carrier to axially shift relative to one another during removal and attachment.

11. The invention of claim 9 wherein the means for hook attachment further comprises a J-shaped projection formed in the hook carrier planar member having a free end for installation of a hook when the hook carrier is removed from the body, said free end aligned within the ventral slot when the hook carrier is attached to the body thereby securely retaining the hook in place.

12. The invention of claim 11 wherein said hook carrier enlarged head is formed of a resilient plastic material.

13. The invention of claim 9 wherein said body and hook carrier planar member are further provided with a second resilient fastener means axially spaced apart from the body first end and enabling the hook carrier to be resiliently attached and detached from the body as a result of relative movement therebetween along a fastener axis which is generally perpendicular to the axis of the body and falling within the plane of the ventral slot.

* * * * *

UNITED STATES PATENT AND TRADEMARK OFFICE
CERTIFICATE OF CORRECTION

PATENT NO. : 4,745,699

DATED : May 24, 1988

INVENTOR(S) : Steven Gage

It is certified that error appears in the above-identified patent and that said Letters Patent is hereby corrected as shown below:

In the Claims:

In claim 9, column 6, line 38, please delete the word "heat" and insert in its place the word ---head---.

Signed and Sealed this

Twenty-first Day of February, 1989

Attest:

DONALD J. QUIGG

*Attesting Officer*          *Commissioner of Patents and Trademarks*